United States Patent [19]

Sumita

[11] 4,390,263

[45] Jun. 28, 1983

[54] MOUNT MEMBER FOR OPTICAL APPARATUS

[75] Inventor: Toru Sumita, Sakai, Japan

[73] Assignee: Minolta Camera Kabushiki Kaisha, Osaka, Japan

[21] Appl. No.: 260,134

[22] Filed: May 4, 1981

[30] Foreign Application Priority Data

May 10, 1980 [JP] Japan .................................. 55-62047

[51] Int. Cl.³ ............................................ G03B 17/00
[52] U.S. Cl. .................................... 354/286; 350/257
[58] Field of Search ........................ 354/286; 352/231; 350/252, 257

[56] References Cited

U.S. PATENT DOCUMENTS 3,682,069 8/1972 Lecoeur .......................... 354/286 X

FOREIGN PATENT DOCUMENTS 931887 7/1963 United Kingdom ................ 354/286

Primary Examiner—John Gonzales
Attorney, Agent, or Firm—Wolder, Gross & Yavner

[57] ABSTRACT

In a mount by which two desired components of an optical apparatus, such as a camera, are attached to or detached from each other by being moved relative to each other in sliding contact, a mount member has a mount surface formed on the component and is made of an oil-impregnated sintered stainless steel at least at the mount surface.

10 Claims, 5 Drawing Figures

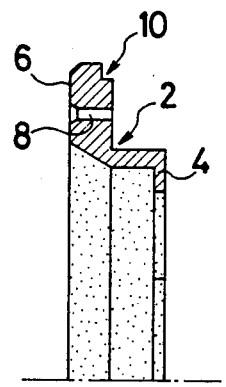
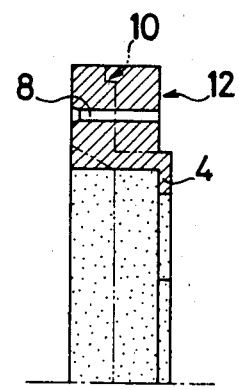
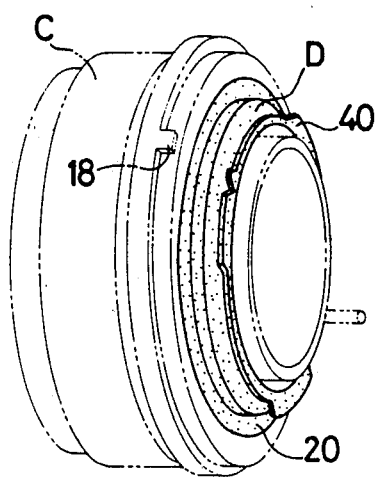

MOUNT MEMBER FOR OPTICAL APPARATUS

BACKGROUND OF THE INVENTION

The present invention relates to a mount member by which components of an optical apparatus are attached to or detached from each other.

Generally with optical apparatus including an interchangeable part, typically in the case of cameras in which an interchangeable lens is used, the interchangeable lens and the camera body are adapted to be brought into intimate pressing contact with each other by a great force at the mount surfaces of their mount members when the lens is attached to the camera body so that the focal plane of the lens coincides with the plane of the film in the camera. Accordingly when the interchangeable lens is attached to or detached from the camera body, the mount surfaces are caused to slide on each other under great pressure. The mount surface of such a mount member is formed by plating nickel-chrome on a stainless steel or brass substrate or by subjecting an aluminum substrate to anodic oxidation and therefore has a very high coefficient of friction.

To reduce the friction between the opposed mount surfaces, a lubricant is usually applied to the mount surfaces. However, this involves the drawback that when the interchangeable lens is detached from the camera body, the lubricant coating (or film) is easily removable by contact with some other article or by being erroneously wiped off by the user upon cleaning of the camera. When the mount surface is thus depleted of the lubricant, the lens fails to smoothly fit in and disengage from the camera body due to increased friction between the mount surfaces, producing wear on the mount surfaces. Such wear, if produced markedly, is likely to result in the serious objection that the flange back of the camera alters.

The above problems experienced with cameras are also encountered with various other optical systems generally used.

SUMMARY OF THE INVENTION

An object of the present invention is to eliminate the foregoing drawbacks of conventional optical apparatus and to provide a mount member which has outstanding wear resistance and by which components of optical apparatus can be attached to and detached from each other smoothly at all times.

Another object of the present invention is to provide a mount member having high corrosion resistance and repeatedly usable for the attachment and detachment of such components without entailing impaired accuracy and reduced surface gloss.

Another object of the invention is to provide a mount member having a mount surface which can be replenished with lubricant oozing from its interior even when the lubricant coating on the surface is once removed therefrom with a degreasing solvent or the like, the mount member thus being made usable free of trouble and rendering the apparatus very easy to clean during usual use or assembling.

To fulfill the foregoing objects, the mount member of the present invention is essentially characterized in that it is made of an oil-impregnated sintered stainless steel to provide a mount surface for a component of an optical apparatus, which surface comes into sliding contact with the opposed mount surface of another component. The mount member may be made of the oil-impregnated sintered stainless steel only at the mount surface.

Another feature of the invention is that the oil-impregnated sintered stainless steel forming the mount surface of the mount member has such a porosity as to assure desired lubrication and give a satisfactory appearance to the mount member.

Still another feature of the invention is that the oil-impregnated sintered stainless steel is an austenitic stainless steel having especially high resistance to corrosion or wear.

Other features of the invention will become apparent from the following description given with reference to the accompanying drawings.

BRIEF DESCRIPTION OF THE DRAWINGS

FIG. 3 is a sectional view of the mount member shown in FIG. 2;

FIG. 4 is a sectional view showing the mount member in the condition before having unnecessary portions cut off; and FIG. 5 is a perspective view showing a mount member as used for an interchangeable lens.

DESCRIPTION OF THE PREFERRED EMBODIMENTS

Figure 1:
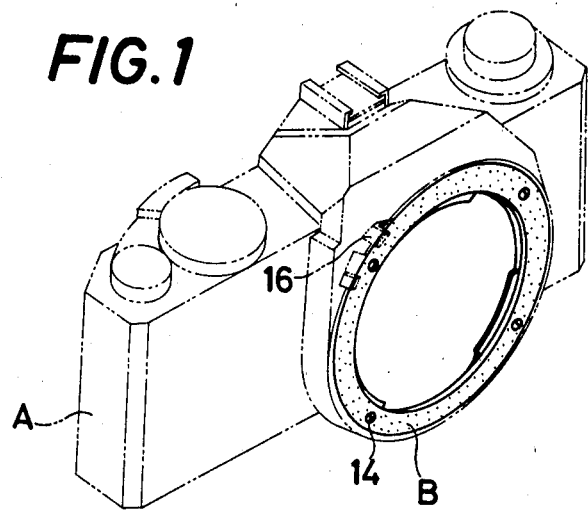
FIG. 1 is a perspective view showing a mount member embodying the invention and used as a bayonet mount on the body of an optical apparatus, namely a camera.

An embodiment will be described below with reference to FIGS. 1 to 4. A camera as an optical apparatus includes a body A as a component thereof. A mount member 2 serving as a bayonet mount B is in the form of an integral piece of oil-impregnated sintered stainless steel and has byonet pawls 4, a mount surface 6 and screw holes 8 for fastening screws 14. A diaphragm information receiving member 16 on the camera body A indicated in phantom lines in FIG. 1 fits in a stepped portion 10 formed in the mount member 2.

The bayonet mount member 2 is made by the following procedure. Among other austenitic stainless steels, finely powdered (for example, to ASTM 100 mesh) low-carbon AISI 316L (Japanese Industrial Standards (JIS) SUS316L) steel is used as a material for the mount member 2 according to the present embodiment. The steel consists approximately of 0.01% C, 0.9% Si, 0.05% Mn, 0.01% P, 0.01% S, 13% Ni, 17% Cr, 2.5% Mo and 65% Fe in weight percentage. To obtain a green compact of uniform density and to reduce the friction between the steel powder and the wall of the die to be used for compression molding, a powder lubricant, such as stearic acid, is added in an amount of about 0.5 to about 2.0% to the AISI 316L steel powder. With further addition of pre-forming agents, such as ammonium bicarbonate powder and ferrous hydroxide, the steel powder is subjected to forced agitation or vibration to obtain a uniform mixture. The amount of such pre-forming agents is so adjusted that the porosity of the resulting sintered product, i.e. the ratio of the combined volume of the fine pores therein to the overall volume of the product, will be about 0.12. The porosity of the mount surface of the mount member according to the invention is preferably 0.10 to 0.15. When the porosity is in this range, the mount structure, which is an exterior part of the camera, retains an attractive appearance and affords sufficient lubrication. With porosities exceeding 0.15, the mount surface has an impaired metallic gloss due to the presence of numerous minute pores, whereas porosities less than 0.10 fail to assure sufficient lubrication.

The powder mixture is then subjected to compression molding at a pressure of about 5 tons/cm$^2$ by an automatic press to obtain a compact of the shape similar to that shown in FIG. 4. The compact is heated at a temperature, for example, of 1150° C. for about one hour for sintering to prepare a piece of solidified porous alloy 12 shown in FIG. 4. Prior to the sintering, the powder lubricant and pre-forming agents are melted and vaporized off at 400° to 450° C. However, no special step is always needed for this purpose since these agents are spontaneously removable while the compact is being heated for sintering.

Figure 2:
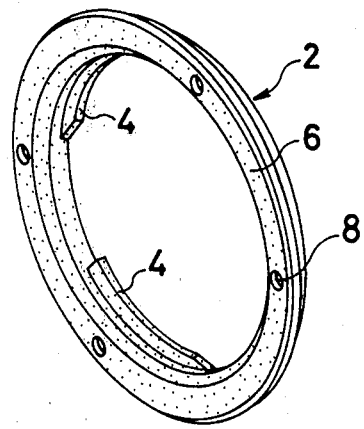
FIG. 2 is a perspective view of the mount member shown in FIG. 1.

With austenitic stainless steels such as AISI 316L Steel, the sintering process produces a shrinkage of about 0.9% in the compact as measured diametrically, so that the sintered pieces 12 are sampled to check them for dimensions, density, surface porosity, air permeability, texture, hardness, strength, etc. The sintered stainless steel piece 12 is thereafter impregnated with a lubricant through the minute pores therein. To ensure improved dimensional accuracy, the sintered piece 12 is subsequently sized according to the present embodiment. For sizing, a die is pressed against the bayonet pawls 4 of the piece 12 contracted by sintering to diametrically enlarge the circle internally in contact with the forward ends of the bayonet pawls 4. Since the sintered piece is impregnated with the lubricant before sizing as stated above, the piece can be sized free of seizure. If the abovementioned circle has a diameter of 42 mm for example, the sizing step gives a reduced tolerance of up to 0.1 mm. Such dimensional accuracy poses no problem in machining the sintered piece. The sized piece 12 is machined by a lathe, milling machine or the like, whereby the bayonet mount member 2 shown in FIGS. 2 and 3 is obtained. The piece can be machined without the necessity of using cutting oil since the oil impregnating the piece serves as a cutting oil.

When the bayonet mount member 2 thus made is fastened to the camera body A, an interchangeable lens can be attached to or detached from the camera body with a turn more than 2000 times without entailing variations in the torque needed therefor. If the lubricant on the mount surface 6 is wiped off with use of a degreasing solvent, the handling torque increases temporarily but rapidly reduces to the initial value through repeated turns of the lens. The lens therefore remains smoothly turnable at all times. This is because the lubricant impregnated in the mount member 2 oozes out from minute pores of the member onto the mount surface under a pumping action.

The diaphragm information receiving member 16 fitted in the stepped portion 10 is made smoothly slidable on the mount member 2 also by the lubrication afforded.

The interchangeable lens may be provided with a bayonet mount having a mount surface of oil-impregnated sintered stainless steel according to the present invention.

FIG. 5 shows a mount member 20 provided on an interchangeable lens C and serving as a bayonet mount D. The mount member 20 is prepared in the same manner as already described and has bayonet pawls 40. Indicated at 18 is a diaphragm information transmitting member on the lens C. With the lens C attached to the camera body A, the member 18 transmits the diaphragm information of the lens C to the body A.

With some interchangeable lenses, the bayonet pawls 40 and the mount may be formed by separate members.

The present invention is useful also for mounts for extension rings, conversion lenses, bellows, etc. Thus the mount member of the invention is useful for attaching an interchangeable lens to the camera body and is also usable as an attaching arrangement for two desired components of cameras and various optical apparatus, such as an interchangeable lens and bellows, interchangeable lens and conversion lens, conversion lens and camera body, and extension ring and camera body.

Although bayonet mount members have been described above as embodiments of the invention, the invention can be embodied similarly as screw mount members. Briefly, in a mount by which two components are attached to and detached from each other with their mount surfaces in sliding contact, the invention provides a mount member for the components.

The desired effect can be achieved when the mount member is used for one of the components to be attached to each other.

Although AISI 316L steel is used as the material to be sintered for the embodiments described, other hard austenitic stainless steels, such as AISI 310S (JIS-SUS 310S) and AISI 317 (JIS-SUS317), can be used as well.

Because the mount member of the invention has a mount surface made of oil-impregnated sintered stainless steel, the mount member always assures smooth turn of the component to be attached or detached, is not prone to defacement owing to its high hardness and retains the surface gloss even if used frequently and repeatedly for attachment and detachment. Further even when the lubricant is wiped off the mount surface with use of a degreasing solvent, the lubricant rapidly oozes out over the surface. Cameras and like apparatus can therefore be cleaned with extreme ease not only during usual use but also during assembling.

When AISI 316L stainless steel is used as the material to be sintered as in the foregoing embodiments, the mount member has outstanding corrosion resistance, possesses a high hardness of 60 to 70 in terms of Rockwell hardness B and therefore retains an attractive appearance over a prolonged period of time.

What is claimed is:

1. In a mount by which two desired components of an optical apparatus are attached to or detached from each other by being moved relative to each other in sliding contact, a mount member characterized in that the mount member has a mount surface formed on the component and is made of an oil-impregnated sintered stainless steel at least at the mount surface.

2. A mount member as defined in claim 1 wherein the oil-impregnated sintered stainless steel has a porosity of 0.1 to 0.15.

3. A mount member as defined in claim 1 wherein the oil-impregnated sintered stainless steel is an austenitic stainless steel.

4. A mount member as defined in claim 3 wherein the oil-impregnated sintered stainless steel is prepared from AISI 316L steel.

5. A mount member as defined in claim 1 which is in the form of a single piece having bayonet pawls and the mount surface and serving as a bayonet mount member.

6. A mount member as defined in claim 1 wherein the optical apparatus is a camera.

7. A mount member as defined in claim 6 wherein the component is a camera body.

8. A mount member as defined in claim 6 wherein the component is an interchangeable lens.

9. A moont member as defined in claim 6 wherein the component is a conversion lens.

10. A mount member as defined in claim 6 wherein the component is an extension ring.

* * * * *